United States Patent [19]
Press et al.

[11] 4,289,340
[45] Sep. 15, 1981

[54] MECHANICALLY ATTACHED END FITTING WITH INSERT FOR METAL TUBING

[75] Inventors: Irving D. Press, West Orange; Harvey R. Nickerson, Roseland, both of N.J.

[73] Assignee: Resistoflex Corporation, Roseland, N.J.

[21] Appl. No.: 974,068

[22] Filed: Dec. 28, 1978

[51] Int. Cl.³ .............................................. F16L 13/14
[52] U.S. Cl. ................................. 285/382.4; 285/422
[58] Field of Search ............... 285/382.4, 382.5, 382.7, 285/258, 115, 222, 422; 29/507, 523

[56] References Cited

U.S. PATENT DOCUMENTS

| | | | |
|---|---|---|---|
| 1,738,915 | 12/1929 | Mueller | 285/382.4 X |
| 2,429,076 | 10/1947 | Sery | 285/382.4 |
| 2,766,804 | 10/1956 | Kaiser | 285/258 X |
| 3,534,988 | 10/1970 | Lindsey | 285/382.4 X |
| 3,575,447 | 4/1971 | Merkle | 285/258 |
| 3,711,132 | 1/1973 | Nickerson | 285/382.4 |
| 3,730,567 | 5/1973 | Webster | 285/382.4 |
| 4,076,287 | 2/1978 | Bill et al. | 285/382.4 |
| 4,147,385 | 4/1979 | van der Velden | 285/382.4 |

Primary Examiner—Dave W. Arola
Attorney, Agent, or Firm—Hopgood, Calimafde, Kalil, Blaustein & Judlowe

[57] ABSTRACT

An end fitting for metal tubing having a bore provided with spaced annular grooves is also provided with a thin hard metal tubular insert which is disposed within the end of the tubing when the tubing is introduced into the bore and extends from the inner extremity of the metal tube to a point beyond the last annular groove. At least a portion of the insert is expanded radially along with the overlying section of the tubing forcing the latter into said grooves. The insert may have an unexpanded end portion which makes at least a snug fit within the unexpanded tube. The result is substantially increased flex life of the metal tube.

9 Claims, 8 Drawing Figures

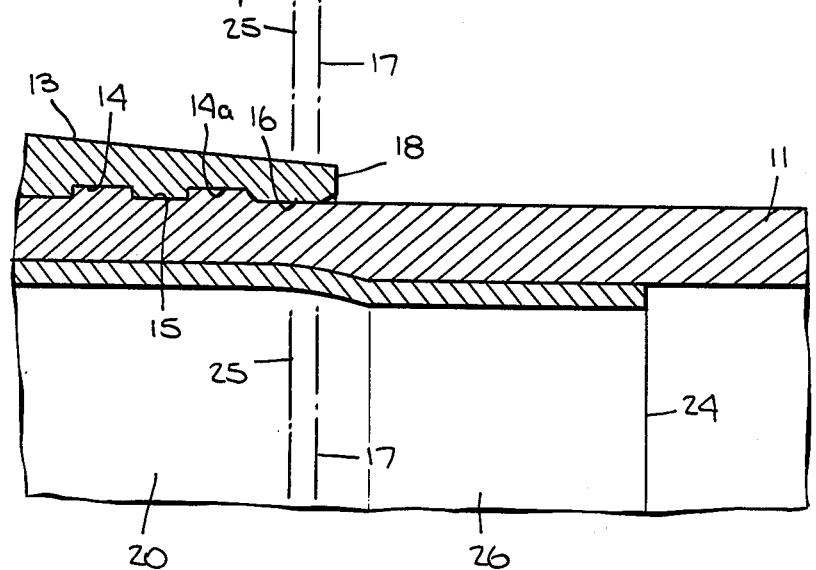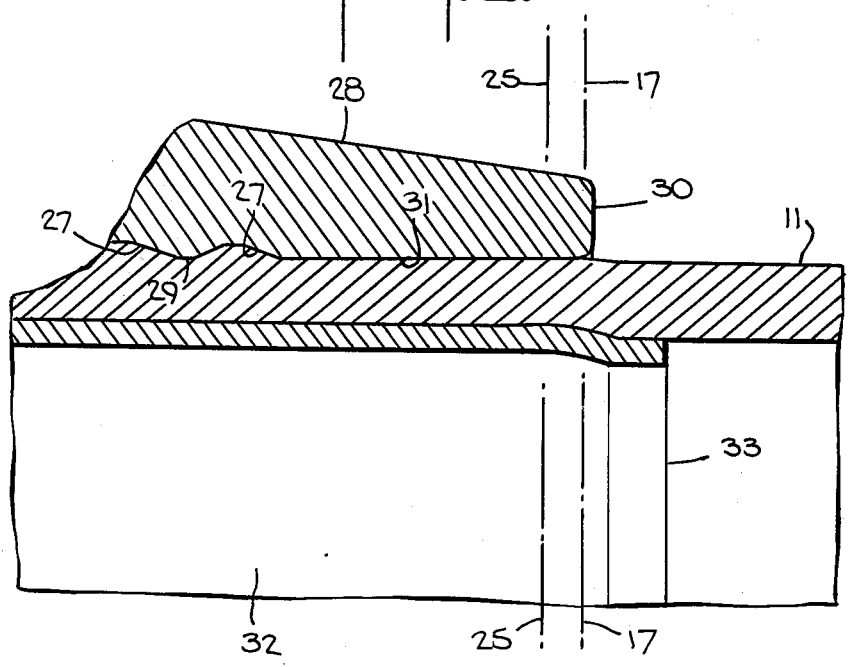

MECHANICALLY ATTACHED END FITTING WITH INSERT FOR METAL TUBING

BACKGROUND OF THE INVENTION

The present invention relates to a fitting for attachment to an end of a thin walled metal tube. More particularly, it relates to that type of fitting which is attached to the tube by expanding the tube within its interior.

Metal tubing is used in critical applications for the conveyance of fluid under pressure. In many such applications, the rupture of the metal conduit can result in a major catastrophe. This is particularly true in the aerospace industry where the tubing is used to convey fuels and hydraulic control fluids. For example, not too many years ago, an experimental aircraft was lost because of hydraulic line failures in its first and second primary flight control systems followed by a failure in its third back-up system. In that case, the failure was traced to the fracturing of metal tubing used to convey the hydraulic control fluid. Metal tubing was used since it has relatively high strength in relation to its weight and, more importantly for an hydraulic system, resists volumetric expansion and contraction when called upon to handle pulsating fluid pressures. Unfortunately, metal suffers from fatigue, tends to develop cracks when subjected to certain regimes of vibration, and is susceptible to chafing induced failure. Experience has also shown that metal tubing is liable to develop cracks where the tube enters an end fitting. Flexural strength testing in accordance with paragraph 4.7.7 of Specification MIL-F-18280C of aluminum alloy tubes secured to end fittings of the general type disclosed in U.S. Pat. No. 3,711,132, (issued Jan. 16, 1973 to Harvey R. Nickerson and assigned to the same assignee as the present application) revealed that the tubes most frequently experience circumferential fractures within an axial zone ranging from about 0.06 to 0.1 inches inside the fitting envelope although occasional fractures occur just outside the fitting.

Said Nickerson patent describes a fitting assembly which overcame certain fitting related fatigue failure problems encountered with titanium alloy conduits. For the purpose of extending the flex life of such conduits said patent disclosed and claimed a modified fitting wherein the axially spaced circumferential grooves within the bore thereof to which the metal tube is attached by radial expansion are provided with a special contour. The group of grooves nearest the exterior of the fitting is provided with inclined sidewalls, while the inner adjacent group is provided with perpendicular sidewalls. Such fittings have been demonstrated to provide improved performance on aluminum alloy lines as well as on stainless steel and titanium lines. Nevertheless, the performance with respect to aluminum alloy lines still leaves much to be desired.

In copending application Ser. No. 760,108 of Irving D. Press, filed Jan. 17, 1977 for "A Fluid Conduit Assembly", and assigned to the same assignee as the present application, there is disclosed a fluid conduit assembly provided with at least two snug-fitting concentric pipes each of which is independently impervious to fluid. End fittings are secured to each end of the conduit and have separate portions joined, respectively, to a different one of both of the pipes with a separate fluid tight seal therebetween. The outer pipe is metallic while the inner pipe is non-metallic. It was disclosed in said application that the non-metallic liner had a response to mechanical vibration which imposed a damping factor on vibration of the metal conduit. It was pointed out that the non-metallic pipe appeared to damp vibration of the metal pipe to such an extent that at least when the metal pipe is in the form of tubing, substantial increase in flex life is obtained before fracture or fatigue failure of the metal tube.

SUMMARY OF THE INVENTION

It has now been discovered that the flex life of metal tubing of aluminum alloy can be extended greatly by including within the end fitting a thin hard metal tubular insert which enters the tubing and extends from the extremity of the tubing to a point beyond the annular groove which is nearest the exterior of the socket. Various theories have been considered as an explanation of the principle underlying the subject improvement but none has been deemed satisfactory.

In accordance with one aspect of the present invention there is provided a fitting for attachment to an end of a thin walled metal tube, said fitting comprising a hard metal body portion having a bore which can be entered for a given distance with a sliding fit from one end by the end of a metal tube, said bore having its sidewall within said given distance formed with a plurality of axially spaced circumferential grooves separated from each other and from said one end of the bore by a corresponding contiguous cylindrical land section, said land sections having substantially the same inside diameter, and a hard metal tubular insert for insertion into said end of said metal tube, said insert having a length and construction such that it extends axially from said end of said metal tube, when inserted in the latter and assembled to the body portion, to a point beyond that one of said grooves which is closest to said one end of the bore.

BRIEF DESCRIPTION OF THE DRAWINGS

The invention will be better understood after reading the following detailed description of the presently preferred embodiments thereof with reference to the appended drawings in which:

FIG. 5 is an enlarged view of a detail of the assembly of FIG. 4;

FIG. 6 is a view similar to FIG. 5 showing a modified fitting embodying the present invention;

The same reference numerals are used throughout the drawings to designate the same or similar parts.

Referring to FIGS. 1 and 2 of the drawings there is shown therein a typical prior art female type end fitting 10 secured to the end of an aluminum alloy tube 11 by expanding the latter radially outwardly within the bore 12 of the socket 13 so as to displace metal of the tube into the annular grooves 14. The union end of the fitting is unimportant insofar as the present invention is concerned and one type of female fitting is shown for purpose of illustration. Obviously, a male fitting could be secured to the metal tube 11 in the same manner and other fluid sealing arrangements could be substituted.

Figure 1:
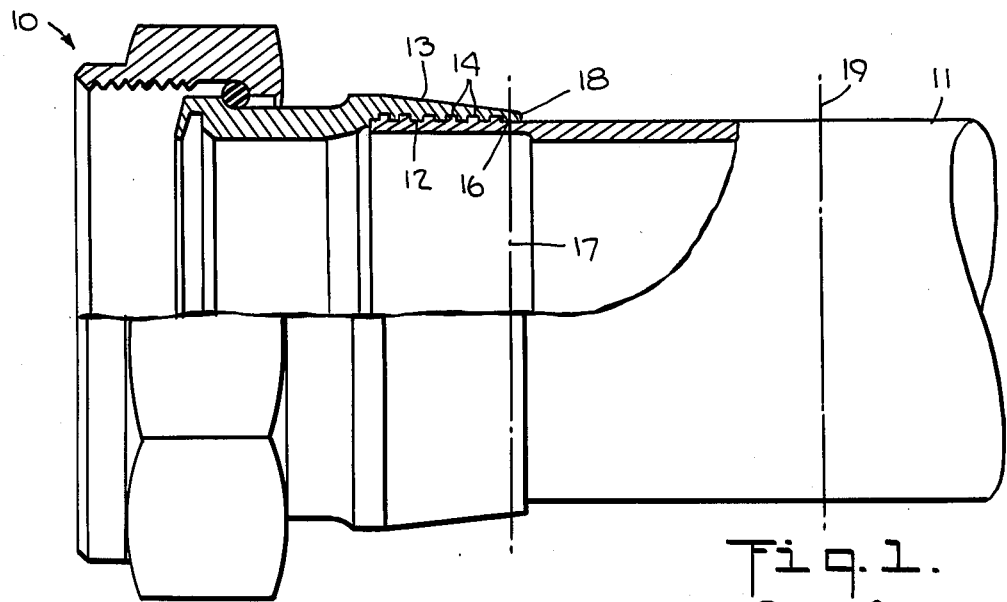
FIG. 1 is a longitudinal view, partly broken away, illustrating a prior art fitting joined to a metal tube.

Certain details of the tube and fitting assembly should be observed. The grooves 14, with the exception of the outermost groove 14a, have perpendicular side walls, and are separated from one another by corresponding cylindrical land areas 15.

The groove 14a has its innermost side wall perpendicular while its outermost side wall is radiused and separated from the exterior of the socket by another cylindrical land area 16. In this embodiment of the fitting all of the cylindrical land areas 15 and 16 have the same diameter. The land area 16 has its outermost edge coinciding with the imaginary transverse plane 17 which is spaced axially a slight distance within the bore of the fitting from the exterior end surface 18 thereof. The wall of the bore 12 is radiused outwardly towards the surface 18 providing immediately adjacent the surface 18 a slight relief for the tube 11 as it enters the socket 13. The radial expansion of the tube is such that the metal of the tube is not expanded to any significant degree outwardly of the plane 17, the expansion commencing to taper off about 0.030 inches from surface 18. The plane 17 may be spaced axially inward from the surface 18 of the socket 13 by approximately 0.018 inches in a typical fitting construction.

Figure 2:
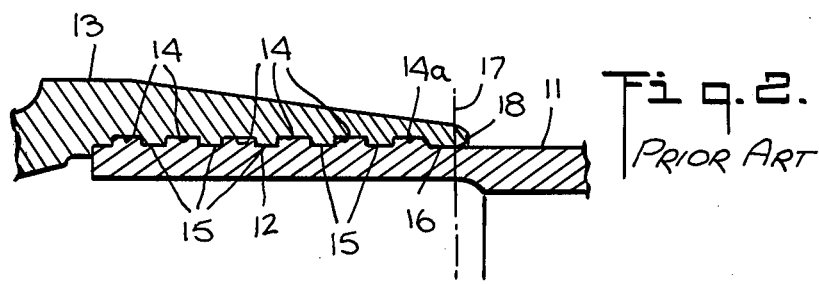
FIG. 2 is a fragmentary view on an enlarged scale illustrating a detail of the prior art assembly shown in FIG. 1.

A common material for the tubing 11 for aircraft service is type 6061-T6 aluminum alloy. When tubes of such alloy have been assembled as shown in FIGS. 1 and 2 to end fittings fabricated from 17-4PH stainless steel or to slightly modified fittings fabricated from 6AL-4V Titanium alloy and subjected to flexural testing in accordance with paragraph 4.7.7 of Specification Mil-F-18280C the tubes tend to develop circumferential fractures which are most frequently located inside the fitting envelope spaced within the range of 0.06 to 0.1 inches from the end surface 18. Occasionally, failures occur outside of the fitting, but when they do they are most likely to fall within the space bounded by the fitting and the imaginary plane 19. Where the latter is spaced axially from the surface 18 of the socket 13 by a distance of about 1 inch, it can be generalized that most failures from the subject test occur within the region bounded by the plane 19 and a plane located 0.1 inches inside of the socket 13. Experience has also shown that such failures occur well below the capability of the tubing per se.

Figure 3:
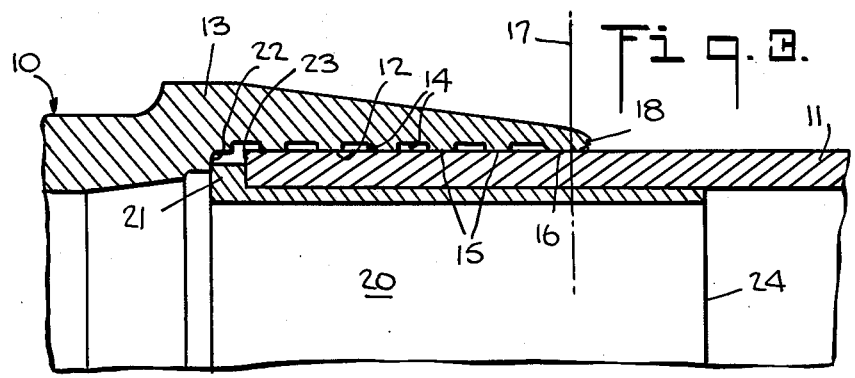
FIG. 3 is a fragmentary longitudinal sectional view of a tube and fitting assembly embodying the present invention but prior to expansion of the insert and tube end.
Figure 4:
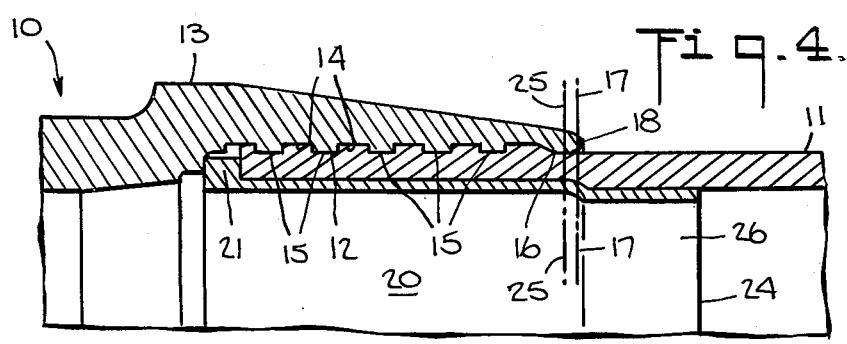
FIG. 4 is a view similar to FIG. 3 but showing the assembly after completion of the expansion step.

It was discovered quite surprisingly that the flexural strength of such assemblies could be increased substantially by incorporating a thin hard metal tubular insert within the end of the metal tube inside of the fitting as shown, for example, in FIGS. 3, 4 and 5, to which attention should now be directed. The socket 13 may be substantially the same as that described above with reference to the prior art. However, the insert designated by the reference numeral 20 has an outside diameter over most of its length which prior to expansion makes at least a snug fit with the bore of the tube 11. The end of the insert 20 which extends from the tube 11 is provided with an enlarged outer diameter providing a shoulder 21 for positioning the insert 20 relative to the end of the metal tube 11 and relative to the body portion or socket 13 of the end fitting 10. As seen in FIG. 3, prior to expansion of the insert 20, the shoulder 21 abuts a step 22 within the socket 13 while the tube 11, making a slip fit within the socket 13, abuts the shoulder 21. The insert 20 in the present example is longer than the bore 12 of the socket 13 such that it extends axially from the end 23 of the metal tube 11 when inserted in the latter to a point 24 beyond the end surface 18 of the socket 13. The projection of the inner end 24 of the insert 20 beyond the end surface 18 of the socket 13 does not appear to be critical. In fact, it has been found that the insert may be just as effective when it terminates within the fitting 10 between the surface 18 and the nearest groove 14a.

After assembling the fitting components 10 and 20 to the end of the tube 11, the insert 20 along with the overlying section of the tube 11 is radially expanded uniformly from and including the shoulder 21 to a plane 25, see FIG. 5, approximately 0.030 inches from the exterior surface 18 within the fitting whereupon the expansion tapers off, as shown. The insert 20 should be formed from metal having sufficient malleability to permit said radial expansion. As shown, the insert 20 is radially outwardly deformed along with the overlying tube 11 in intimate contact with tube 11 over an axial portion thereof, while the remaining portion 26, if any, of the insert 20 has an undeformed outside diameter which makes at least a snug fit with the unexpanded inside diameter of metal tube 11.

Preferably, the metal of the socket portion 13 of the fitting 10 is selected from the group consisting of stainless steels and titanium alloys and the insert 20 is formed from a stainless steel, when the metal of the tube is selected from the group consisting of aluminum and aluminum alloys.

For the purpose of demonstrating the efficacy of the present invention a number of assemblies were prepared wherein the fitting had a socket 13 with a bore 12 making a sliding fit with the outside surface of a tube having an outside diameter of 1.250 inches and a wall thickness of 0.049 inches. The inserts were formed with a wall thickness of approximately 16 mils and with a length related to the axial extent of the bore 12 of the socket such that the end 24 of the insert projected approximately 0.204 inches beyond the end surface 18 of the socket 13 when assembled thereto. Identical assemblies minus the insert 20 also were prepared to serve as controls. The end fittings were fabricated from 17-4PH stainless steel, with the inserts of type 304 stainless steel, ⅛th hard, and the tubes were made from 6061-T6 aluminum alloy. The assemblies were subjected to testing in accordance with the specification identified above. Briefly, the test involves mounting the assemblies in a fixture supporting them as a cantilever beam and subjecting the free end to bending back and forth while measuring the oscillating stress with suitably mounted strain gages to determine the maximum bending stress at each flexure. A constant stress is maintained on the assembly due to internal hydraulic pressure kept at 1000 psi. The test assembly is subjected to repeated flexure at a rate of 3000 cycles per minute until failure occurs as evidenced by the loss of internal fluid pressure. The results are tabulated below in runs 8, 9, 10 and 11.

Another series of assemblies were fabricated and similarly tested but using 1 inch tubing of the same aluminum alloy. However, for this series the fitting socket was constructed of 6AL-4V titanium alloy as shown in FIG. 6 wherein the outermost grooves 27 of the socket 28 have sloping side walls and are separated from one another by cylindrical lands 29. The outermost groove 27 is separated from the end surface 30 of the socket 28 by the cylindrical land area 31 terminating at plane 17 where it merges with a radius into the end surface 30. While not apparent from the drawings the land area 31 has a slight taper of about 1° with the larger diameter coinciding with the plane 17. For further explanation of the construction of the socket 28 reference may be had to the abovementioned U.S. Pat. No. 3,711,132. In other respects the socket 28 and insert 32 may be substantially the same as that shown in FIGS. 3, 4 and 5, except for the length of the insert. As shown in FIG. 6 the inner end 33 of insert 32 extends about 0.050 inches into tube 11 beyond the end surface 30 of the socket 28. The planes 17 and 25 are located at the same distances as in FIG. 5. The results of these tests, with and without the insert 32, are also tabulated below as runs 1 to 7, inclusive.

Figure 7:
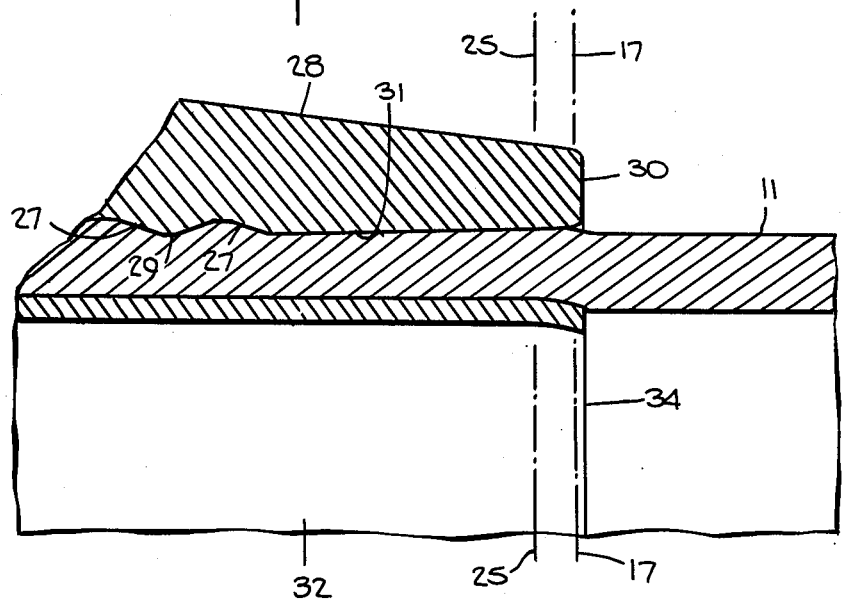
FIG. 7 is a view similar to FIG. 6 showing a further modification of the fitting.
Figure 8:
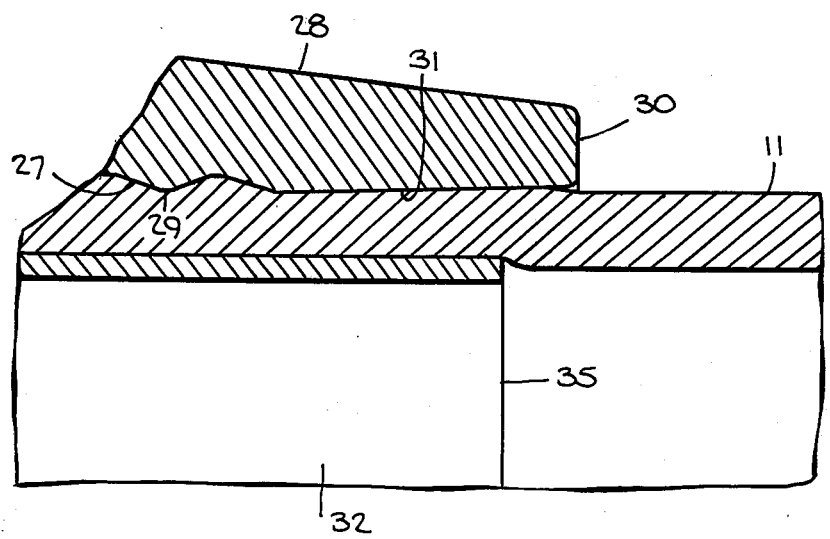
FIG. 8 is a view similar to FIG. 6 showing yet another modification of the fitting.

In order to explore the effect of changing the length of insert 32, four additional assemblies were constructed, one exactly as shown and described with reference to FIG. 6; another, as shown in FIG. 6, but with the end 33 of the insert extending about 0.100 inches into the tube 11 beyond surface 30 of socket 28; a third as shown in FIG. 7 with the insert 32 terminating at 34 flush with the end 30 of socket 28; and a fourth as shown in FIG. 8 with the insert 32 terminating at 35 set back from end surface 30 by about 0.050 inches. In all other respects the assemblies of FIGS. 6, 7 and 8 are the same. The results of these tests are tabulated as runs 12, 13, 14 and 15, respectively.

While the invention has been described as applied to aluminum or aluminum alloy tubing for which it manifests marked improvement in performance, it should afford improved flex life when used with tubing of other metallic materials.

Having described the invention with reference to the presently preferred embodiments thereof it will be understood by those skilled in the subject art that various changes in construction and materials may be effected without departing from the true spirit of the invention as defined in the appended claims.

What is claimed is:

1. A fitting for attachment to an end of a thin walled metal tube, said fitting comprising a hard, metal body portion having a bore which can be entered for a given distance with a sliding fit from one end by the end of a metal tube, said bore having its sidewall within said given distance formed with a plurality of axially spaced circumferential grooves separated from each other and from said one end of the bore by a corresponding contiguous cylindrical land section each of finite axial length, said land sections having substantially the same inside diameter, and a hard metal tubular insert having at least a longitudinally extending portion of substantially uniform thickness throughout its length for insertion into said end of said metal tube, said portion of said insert having a length, outside diameter and construction such that it extends axially from said end of said metal tube, when inserted in the latter and assembled to the body portion, into said metal tube with a snug fit to a point beyond that one of said grooves which is closest to said one end of the bore, and being formed of metal having sufficient malleability to permit radial expansion of at least a portion thereof.

2. A fitting according to claim 1, wherein the metal of said body portion is selected from the group consisting of stainless steels and titanium alloys, and said insert is formed from a stainless steel.

3. A fitting according to claim 1, wherein said insert has a wall thickness on the order of about 16 mils.

| Run No. | Tube Size | Dynamic Bending Stress psi | Cycles to Failure ($\times 10^6$) | | Comments |
|---|---|---|---|---|---|
| | | | Control | Invention | |
| 1 | 1" | 5,000 | 10.30 | ** — | Test halted before |
| 2 | 1" | 6,000 | 10.30 | ** — | failure |
| 3 | 1" | 7,500 | 10.30 | ** — | |
| 4 | 1" | 8,750 | 5.30 | 10.26 | Control failed within socket; no failure of |
| 5 | 1" | | | 10.510 | invention, 2 samples |
| 6 | 1" | 10,000 | 1.22 | 10.45 | Same result as Run 4 |
| 7 | 1" | 12,500 | * — | 0.47 | Leak |
| 8 | 1¼" | 5,000 | 3.173 | 10.260 | Same result as Run 4 |
| 9 | 1¼" | 6,000 | 2.166 | 10.260 | Control failed ¼" from fitting; no failure of invention. |
| 10 | 1¼" | 7,500 | 0.304 | 1.501 | Control failed within socket; invention experienced longitudinal split in tube 7/16" from fitting. |
| 11 | 1¼" | 8,500 | * — | .760 | Tube failed 1" from fitting. |
| 12 | 1" | 12,000 | * — | 0.42 | FIG. 6 |
| 13 | 1" | 12,000 | * — | 0.44 | FIG. 6 with 0.100" extension |
| 14 | 1" | 12,000 | * — | 0.78 | FIG. 7 |
| 15 | 1" | 12,000 | * — | 0.42 | FIG. 8 |

*No control tested.
**No sample tested.

4. A tube joint comprising a hard metal body portion having a bore extending from an exterior surface, said bore having a sidewall formed for a given axial distance with a plurality of axially spaced circumferential grooves separated from each other and from said exterior surface by a corresponding contiguous cylindrical land section, said land sections each having finite axial length and substantially the same inside diameter, a thin walled metal tube having an end disposed within said bore deformed radially outwardly with metal from said tube extending radially into all of said grooves, the outer diameter of said tube outside of said body portion being unexpanded and such that it would normally fit said bore with a siding fit, and a hard metal tubular insert having at least a longitudinally extending portion of substantially uniform thickness throughout its length disposed within said end of said metal tube with one end at the inner extremity of said metal tube and its other end at a point beyond said exterior surface of said body portion, said insert being expanded radially along with the overlying metal tube in intimate contact with the latter, the expansion of said insert being uniform from said one end to a plane that intersects the land section that is contiguous with said exterior surface, and beyond said plane, said expansion of said insert tapering off until beyond said exterior surface said insert is substantially undeformed with an outside diameter that makes at least a snug fit with the unexpanded inside diameter of said metal tube.

5. A tube joint according to claim 4, wherein said plane is located on the order of 0.030 inches from said exterior surface.

6. A tube joint according to claim 4, wherein the metal of said body portion is selected from the group consisting of stainless steels and titanium alloys, said insert is formed from a stainless steel, and the metal of said tube is selected from the group consisting of aluminum and aluminum alloys.

7. A tube according to claim 4, wherein said insert has a wall thickness on the order of about 16 mils.

8. A tube joint comprising a hard metal body portion having a bore extending from an exterior surface, said bore having a sidewall formed for a given axial distance with a plurality of axially spaced circumferential grooves separated from each other and from said exterior surface by a corresponding contiguous cylindrical land section, said land sections each having finite axial length and substantially the same inside diameter, a thin walled metal tube having an end disposed within said bore deformed radially outwardly with metal from said tube extending radially into all of said grooves, the outer diameter of said tube outside of said body portion being unexpanded and such that it would normally fit said bore with a sliding fit, and a hard metal tubular insert having at least a longitudinally extending portion of substantially uniform thickness throughout its length disposed within said end of said metal tube with one end at the inner extremity of said metal tube and its other end lying in a plane that intersects the land section that is contiguous with said exterior surface, said insert being expanded radially along with the overlying metal tube in intimate contact with the latter, the expansion of said insert being uniform from said one end to said plane.

9. A tube joint comprising a hard metal body portion having a bore extending from an exterior surface, said bore having a sidewall formed for a given axial distance with a plurality of axially spaced circumferential grooves separated from each other and from said exterior surface by a corresponding contiguous cylindrical land section, said land sections each having finite axial length and substantially the same inside diameter, a thin walled metal tube having an end disposed within said bore deformed radially outwardly with metal from said tube extending radially into all of said grooves, the outer diameter of said tube outside of said body portion being unexpanded and such that it would normally fit said bore with a sliding fit, and a hard metal tubular insert having at least a longitudinally extending portion of substantially uniform thickness throughout its length disposed within said end of said metal tube with one end at the inner extremity of said metal tube and its other end substantially coinciding with said exterior surface of said body portion, said insert being expanded radially along with the overlying metal tube in intimate contact with the latter, the expansion of said insert being uniform from said one end to a plane that intersects the land section that is contiguous with said exterior surface, and said expansion of said insert tapering off beyond said plane.

* * * * *